Dec. 9, 1941.   K. D. McMAHAN   2,265,737

FLUID CONTROL APPARATUS

Filed June 21, 1939

Inventor:
Kenton D. McMahan,
by Harry E. Dunham
His Attorney.

Patented Dec. 9, 1941

2,265,737

UNITED STATES PATENT OFFICE 2,265,737

FLUID CONTROL APPARATUS

Kenton D. McMahan, Scotia, N. Y., assignor to General Electric Company, a corporation of New York Application June 21, 1939, Serial No. 280,322

3 Claims. (Cl. 137—111)

The present invention relates to fluid control apparatus by means of which the main flow of fluid in a duct is controlled by means of a relatively small secondary fluid flow.

The object of my invention is to provide an improved construction and arrangement in fluid flow apparatus of this type, and for a consideration of what I believe novel and my invention, attention is directed to the following description and the claims appended thereto.

Figure 1:
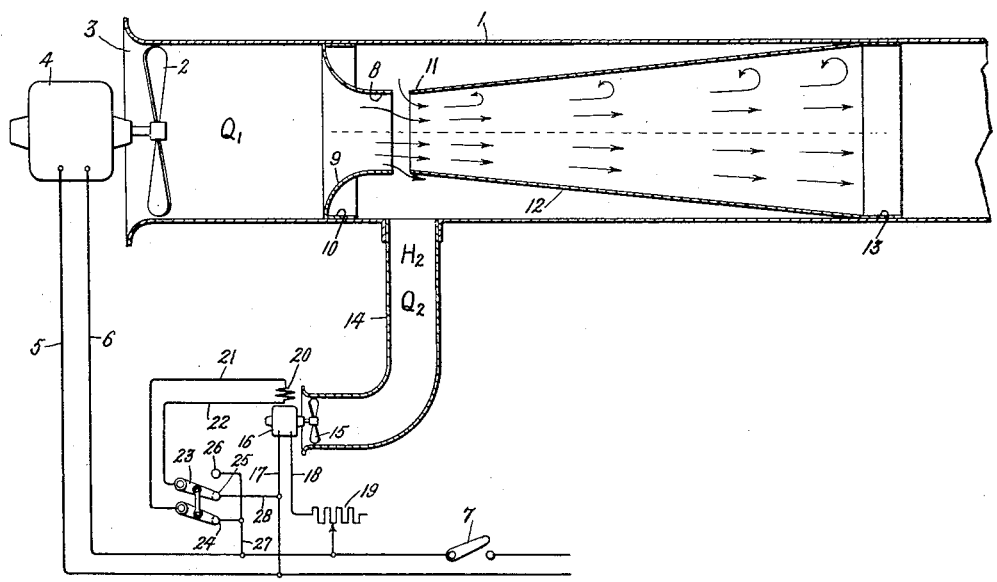
Figure 2:
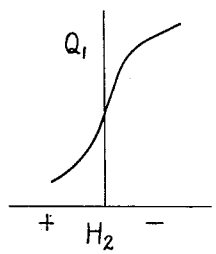

In the accompanying drawing, Fig. 1 is a sectional view of fluid flow apparatus embodying my invention, and Fig. 2 is a curve showing the variation in the main fluid flow in accordance with variations in the pressure of the secondary fluid flow.

Referring to the drawing, there is shown a duct or casing 1 which is supplied by a fan 2 located at the inlet 3. The fan is driven by an electric motor 4 connected to line conductors 5 and 6 in one of which is located a control switch 7. When the switch 7 is closed the fan is rotated to supply fluid to the duct 1. The fluid discharged from the fan flows axially along the duct 1 through an orifice 8 having outwardly flaring curved walls 9 provided at their outer edges with a flange 10 fixed to the inner surface of the duct. The walls 9 decrease the loss in the fluid flowing through the orifice 8. The orifice 8 is concentric with and in closely spaced proximity to the inlet orifice 11 of a reentrant diffuser duct 12 which is supported in the duct 1 by a flange 13 at its outlet fixed to the inner surface of the duct. The orifice 8 and the inlet 11 are of substantially the same size and in axial alignment so that the fluid discharge of the orifice 8 is directed into the diffuser along its axis without change of direction. The inlet 11 is preferably a sharp edged orifice. The walls of the duct 1 between the flanges 10 and 13 enclose the space around the orifice 8 and inlet 11. This space is supplied with a secondary fluid stream conducted thereto by a conduit 14 supplied by a fan 15 driven by an electric motor 16. The armature of the motor is connected across line conductors 5 and 6 by conductors 17 and 18. A variable resistance 19 is connected in the conductor 18. The field 20 of the motor 16 is connected by conductors 21 and 22 to a reversing switch 23 provided with contacts 24, 25, and 26. When the switch is connected to contacts 24 and 25 the field is connected across line conductors 5 and 6 through conductors 27 and 28. When the switch is connected to contacts 25 and 26 the field is connected across the line conductors in the reverse direction and the motor accordingly rotates in the reverse direction. By varying the position of the switch 23 and the resistance of the variable resistance 19, the amount and direction of the secondary fluid flow through the duct 14 may be varied. The secondary fluid flow in the region of the orifices 8 and 11 may be radially inward or outward through the space between the orifices, in other words, in a direction transverse to the direction of the main flow. It has been observed experimentally that the flow of the main fluid stream from the fan 2, designated as $Q1$, is a minimum when the flow and pressure of the secondary fluid stream, designated respectively as $Q2$ and $H2$, are a maximum. As the secondary flow and pressure decrease to zero, the main flow increases. The main flow continues to increase as the secondary flow and head become negative, or, in other words, are changed from pressure to suction. The increase in main flow continues until the maximum capacity of the diffuser duct 12 is reached. The changes in the main flow are shown diagrammatically in Fig. 2. As can be seen from this curve, the main flow varies in a manner similar to the plate current in a grid controlled vacuum tube. In the vacuum tube a large change in plate current is effected by a relatively small change in the grid potential. In the present construction a large change in the main flow $Q1$ is effected by a relatively small change in the secondary fluid pressure or potential $H2$. In the construction illustrated the fan 15, which supplies the secondary fluid flow, has a capacity equal to about 10% of the fan 2 which supplied the main fluid flow. By changing the secondary fluid flow it is possible to effect a variation of ten or more to one in the main fluid flow. This variation is effected without the use of dampers.

The variation in main flow is due to changes in the effective orifice coefficient of the diffuser inlet 11 and to changes in the resistance of the diffuser duct 12. For minimum resistance the fluid from the orifice 8 should flow straight across the space between the orifice and the diffuser inlet 11, and from there should flow parallel to the inner walls of the diffuser duct without eddying. In the present construction this flow condition is obtained when a suction is applied to the duct 14, which causes the fluid to flow along the paths indicated by the arrows in Fig. 1 in the lower half of the diffuser. The minimum main flow is obtained when the duct 14 is subjected to its maximum pressure, causing the greatest secondary flow to the space around the diffuser duct and the orifices 8 and 11. The fluid flow conditions present at this time are illustrated by arrows in Fig. 1 in the upper half of the diffuser. The air flowing inward into the space between the orifices 8 and 11 transverse to the direction of the main flow partially blocks the inlet opening 11 of the diffuser duct and also causes considerable eddying in the fluid flowing through the diffuser duct. This increases the resistance offered to the main flow at the orifice 11 and in the diffuser and, since the fan 2 is driven by a constant speed motor, the main flow accordingly decreases. The extreme conditions have been explained above. In the intermediate conditions the fluid flow conditions are in between the conditions illustrated.

The sharpness of the control afforded by varying the secondary air flow is dependent upon the spacing of the orifices 8 and 11 and the inclination of the diffusion duct 12. For best results the orifices 8 and 11 should be closely spaced and the diffuser duct should have a relatively small angle of inclination. It is also preferable that the inlet opening 11 of the diffuser duct be a sharp edged orifice since this type of orifice is subject to the greatest change in resistance under the conditions present.

The position of the zero axis in Fig. 2, i. e., the position corresponding to zero secondary head $H_2$, varies with the relative diameters of the orifices 8 and 11. If the orifice 8 is larger than the orifice 11, the zero axis will be shifted to the right in Fig. 2. That is, there will be a greater main flow when the secondary head is zero. If the orifice 8 is smaller than the orifice 11, the zero axis will be shifted to the left. A greater negative secondary head will then be required to produce the maximum main flow.

What I claim as new and desire to secure by Letters Patent of the United States is:

1. Fluid flow apparatus for controlling the flow of a fluid stream, comprising a duct having an inlet, a discharge orifice for said fluid stream arranged to discharge said stream along the axis of the duct, the inlet of said duct being in closely spaced proximity to the discharge orifice, a casing enclosing the space around and between the discharge orifice and said inlet, and means for introducing a controlling fluid stream of the same fluid as the said fluid stream into said casing, said means including means for varying the pressure in said casing between positive and negative values to control the flow through the orifice.

2. Fluid flow apparatus for controlling the flow of a fluid stream, comprising a discharge orifice for said fluid stream, an aligned diffuser duct for receiving said stream having an entrance orifice in closely spaced proximity to said discharge orifice, a casing enclosing the space between said orifices, provisions for conducting a controlling fluid stream of the same fluid as the said fluid stream to said casing transverse to the said fluid stream, and means for varying the pressure of the controlling stream between positive and negative values to control the flow of the main stream.

3. Fluid flow apparatus comprising a casing, a duct having an inlet orifice in the casing, means for effecting a main fluid flow into said duct having a discharge orifice in the casing closely spaced from the inlet orifice and arranged to discharge substantially all of its flow axially into said inlet orifice, the arrangement of said means and duct effecting a pressure in said casing above absolute zero pressure, and means independent of said first means for increasing or decreasing the pressure within the casing for controlling the flow effected by said first means.

KENTON D. McMAHAN.